United States Patent Office 3,428,475
Patented Feb. 18, 1969

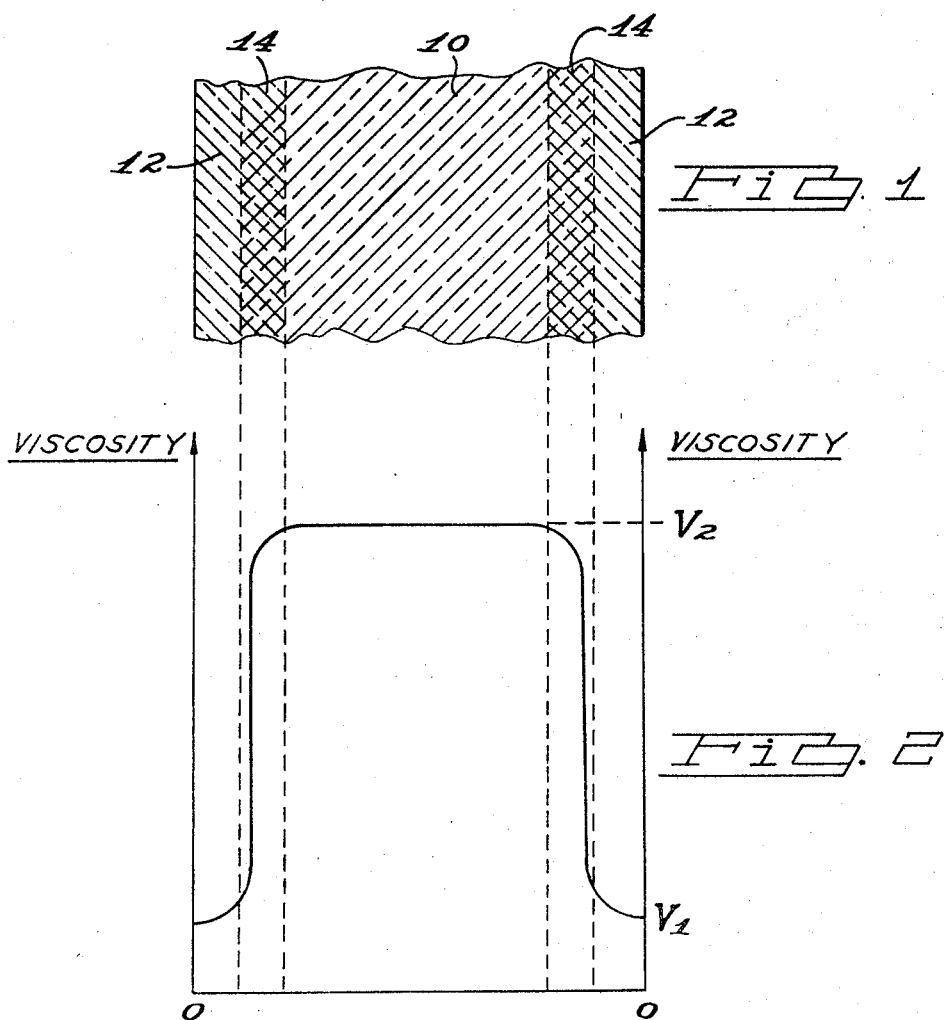

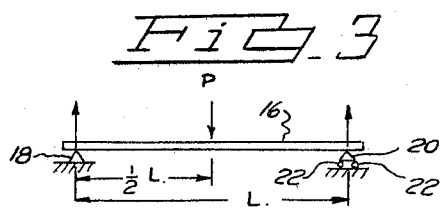
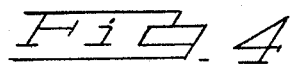
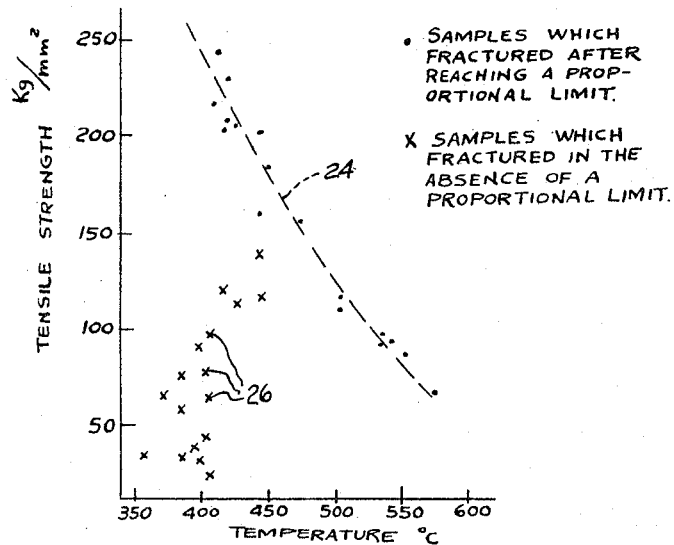
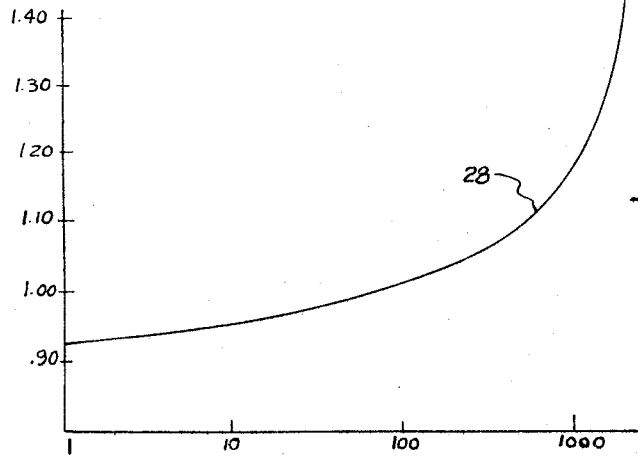
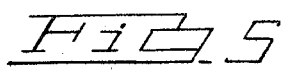

3,428,475
HIGH STRENGTH GLASS AND METHOD FOR MAKING THE SAME
Robert O. Teeg, Grosse Pointe, Mich., assignor to Teeg Research, Inc., Detroit, Mich., a corporation of Delaware
Continuation-in-part of applications Ser. No. 325,282, Nov. 21, 1963, Ser. No. 546,249, Apr. 29, 1966. This application Nov. 17, 1966, Ser. No. 595,231
U.S. Cl. 117—54          4 Claims
Int. Cl. C03c 17/02, 3/00

ABSTRACT OF THE DISCLOSURE

The present invention relates to novel high strength glasses and to a method for manufacturing glasses having distinctive physical qualities obtained by coating a first glass of predetermined viscosity with a second glass of lower viscosity such that the coating is substantially in a plastic phase at the temperature of use of the glass composite.

---

This application is a continuation-in-part of application Ser. No. 546,239, filed Apr. 29, 1966, which is a continuation of application Ser. No. 325,282, filed Nov. 21, 1963, both now abandoned.

Although known for many centuries, because of its fragility glass has had limited use as a structural material until recently. It has also been known for quite some time that glass is much stronger in compression than in tension or under bending stress. It has been calculated that the theoretical modulus of rupture (M.O.R.) of ordinary silica glass is in the order of one to two million p.s.i. (700 to 1400 kg./mm.²). This theoretical limit is, however, far from being reached as ordinary annealed silica glass has a M.O.R. of about 7,000 p.s.i. (4.9 kg./mm.²), physically tempered glass has a M.O.R of 20,000 to 40,000 p.s.i. (14 to 28 kg./mm.²), and chemically strengthened glass has a M.O.R. of 80,000 to 100,000 p.s.i. (40 to 70 kg./mm.²). It is thus apparent that ordinary glass is still very far from the theoretical limit. In an article by Joseph S. Olcott, published in "Science" magazine of June 14, 1963, pages 1189–1193, may be found an excellent and exhaustive review of the progress accomplished over the years in developing techniques for strengthening glass by quenching (physically tempered glass) and by chemical treatment of glass surface (chemically strengthened glass).

It seems that, as postulated by A. A. Griffith in 1920 (Phil. Trans. Roy. Soc. London 221 A, 163), the very low strength of glass resulting in brittle fracture under low stress is due to the existence of very fine microcracks on the surface of the glass. The cracks tend to act as stress raisers initiating fractures that cause the glass to break under tension or bending even when subjected to relatively low stress.

The present invention provides a method for physical strengthening of glass by eliminating all the pre-existing microcracks on the surface of glass and by providing a surface in which such cracks can neither be generated nor propagated. This is obtained by coating an article made of a first glass of a given viscosity with an outer layer of a second glass having a lower viscosity and which is capable of forming a bond continuum with the glass of the article. Among various techniques, this coating may be obtained by dipping the article of solid glass having a higher softening point (temperature), that is, of a higher viscosity, into a bath of glass having a lower softening point, that is of a lower viscosity.

The principal object of the invention, therefore, is to provide a glass having considerable physical strength which is much superior to the strength ordinarily obtained by quenching or by chemical treatment. Other objects and advantages will become apparent from the following description taken in connection with the accompanying drawings wherein:

FIG. 1 represents a glass article having an exterior glass layer of relative low viscosity fused to an inner glass portion of relative high viscosity;

FIG. 2 represents a diagram of the variation of viscosity across the glass article of FIG. 1;

FIG. 3 is a schematic representation of a typical test fixture used for testing the strength of glass test samples prepared according to the present invention;

FIG. 4 is a graph representing the test results obtained in an example of a glass prepared according to the present invention; and FIG. 5 is a graph representing the modulus of rupture of a glass prepared according to the invention as compared to the modulus of rupture of the same glass having its surface etched so as to remove surface microcracks, in function of aging time.

The principle of the invention consists in coating a first glass having a predetermined viscosity range with a thin layer of a second glass having a lower viscosity. That is, the first or interior glass has a higher viscosity than the second or outer layer of glass. The outer layer of glass has a lower viscosity than the interior glass and forms a bond continuum with the first or interior glass. The glass having the lower viscosity has sufficiently low viscosity at the temperature of use so that it does not sustain the presence of microcracks, and therefore prevents the initiation and the propagation of fracture from the surface layers to the load bearing interior glass. This may be done either by dipping an article made of the first glass into a bath of molten second glass, or, alternately, by disposing a sheet 10 of the high viscosity glass (FIG. 1) between two substantially thin sheets 12 of the second glass having lower viscosity, the sheets being subsequently fused together at their junction interdomain region 14 by application of heat sufficiently high to fuse the two glasses together, such that the inner glass core is in a solid state and the outer layer is in a relatively plastic state.

The finished article, consequently, comprises the core 10 (FIG. 1) made of glass having a high vicosity and the outer layer 12 of a glass having a lower viscosity with an intermediate interdomain region 14 consisting of a progressively variable composition of the two glasses from the surface layers to the inner core section such that the inner glass core is in a solid state and the outer layer is in a relatively plastic state. The inner core and the outer layers must be made of glasses of the same type or of glasses having an affinity for each other so as to provide a bond interdomain continuum. What is meant by affinity is that the outer glass must be at least capable of "wetting" the inner glass.

As represented in FIG. 2, if the inner core consists of a first glass composition having a given viscosity $V_2$, which usually correlates with a given softening point (temperature), and the outer layers 12 consist of a second glass composition having a lower viscosity $V_1$, which usually correlates with a lower softening point (the softening point of a glass being arbitrarily defined as the temperature at which the glass has a viscosity of $10^7$ poises), the proportions of first glass and second glass along a cross-section of the treated glass article vary from 100% of the second glass at the surface of the article to 100% of the first glass within the core 10, with constantly varying proportions in the intermediate domain regions 14, resulting in varying viscosity along the cross-section, at a given temperature of use, substantially according to the curve of FIG. 2. The practical range of viscosity at which the treated glass article is provided with considerably increased strength is the range where the outermost layers are of adequately low viscosity, and the innermost layer is of adequately higher viscosity to sustain a load without significant deformation during its intended time of use. It is to be noted that, in use, the glass of the inner core is in a solid phase, while the glass of the outer layers is in a more plastic phase, the purpose of which is to provide outer layers of glass being relatively and adequately plastic in use. In other words, a glass article made according to the present invention may be used at temperatures below the so-called strain temperature of the inner glass, which is the temperature at which glass has a viscosity higher than $10^{14.5}$ poises which is considered an adequate viscosity permitting a glass article to sustain a load without being subjected to a significant deformation, as long as such temperature of use is in a range causing the outer glass to be a plastic state, i.e. having a viscosity that does not permit it to sustain a load without significant deformation.

Example I

Test sample rods of 4 mm. in diameter and six inches in length of a borosilicate glass of the following composition (Corning Glass Works Code No. 7740):

| | Percent |
|---|---|
| $Na_2O$ | 3.8 |
| $SiO_2$ | 80.5 |
| $B_2O_3$ | 12.9 |
| $Al_2O_3$ | 2.2 | and having a softening point (temperature) of 820° C., were prepared from longer rods in the following manner:

Selected rods, from which test samples were cut, were rods which had been visually examined and found to be free from severe flaws such as bubbles, deep scratches, and channel voids. An end section of each rod, approximately six inches in length, was scribed with a batch and rod number, then cut and stored as a control sample. The samples for testing were then obtained by what were now essentially center cuts from the remaining length of each rod. These test sample rods were given an individual screening which excluded samples with bubbles and channel voids which would not have been eliminated by the subsequent preparation treatment.

Test sample rods were considered as individual units and at no time were the samples permitted to contact each other. Handling was minimized and, when necessary, only the ends of the test sample rods were gripped. Cleaned test sample rods were placed in a polyethylene jig designed for etching in a HF bath. After experimenting with various combinations of HF, HCl, and $H_2SO_4$, an etchant was selected containing at least 15% HF and 15% HCl.

The test sample rods were etched for a duration of about 30 minutes, so as to remove from the rods surface cracks and defects. 0.4 to 0.5 mm. in depth was thus removed by etching from the test sample rods, and the removal rate being monitored by periodic micrometer measurements. The test sample rod final diameter is not critical as experience has demonstrated that the tensile stress is not diameter dimension dependent. Sample rods were then immersed in a thermally and compositionally homogenized bath of a coating glass consisting of lead-silicate glass (Corning Glass Works Code No. 8363), having a softening point of 380° C. and the following composition:

| | Percent |
|---|---|
| PbO | 80.42 |
| $SiO_2$ | 5.13 |
| $Na_2O$ | .04 |
| $Al_2O_3$ | 3.38 |
| $B_2O_3$ | 10.37 |

The immersed test sample rods were not permitted to contact each other during the coating process and were agitated periodically. The test sample rods were maintained in the melt for 4 hours and the melt was maintained at a temperature of 600° C.

The test sample rods were tested in bending by a 3-point loading technique. A schematic representation of the fixture designed for this purpose is shown in FIG. 3. Testing was performed by a modified Instron Universal Tensile Tester with a specially designed thermal chamber controllably holding the test temperature ±2° C. up to 1,000° C. As shown in FIG. 3, each test sample rod 16 was supported on both ends by support ways 18 and 20, one of which was capable of lateral motion, by being mounted upon rollers 22, when the rod 16 was deflected under the influence of a load P being applied at mid point between the support ways 18 and 20. By such an arrangement the influence of any load being directed along the axis of the test sample rod 16 was eliminated.

The test results achieved are tabulated in the following table:

| Sample No. | Test temperature (° C.) | M.O.R. (kg./mm.²) |
|---|---|---|
| 1 | 630 | 1.4 |
| 2 | 600 | 102 |
| 3 | 595 | 112 |
| 4 | 580 | 175 |
| 5 | 565 | 154 |
| 6 | 565 | 132 |
| 7 | 565 | 252 |
| 8 | 555 | 132 |
| 9 | 555 | 275 |
| 10 | 540 | 325 |
| 11 | 540 | 345 |
| 12 | 525 | 335 |
| 13 | 525 | 322 |
| 14 | 525 | 518 |
| 15 | 520 | 294 |
| 16 | 520 | 392 |
| 17 | 515 | 345 |
| 18 | 515 | 372 |
| 19 | 515 | 505 |
| 20 | 515 | 356 |
| 21 | 505 | 378 |
| 22 | 505 | 490 |
| 23 | 505 | 416 |
| 24 | 505 | 630 |
| 25 | 485 | 350 |
| 26 | 485 | 416 |
| 27 | 475 | 364 |
| 28 | 475 | 406 |
| 29 | 460 | 416 |
| 30 | 440 | 225 |
| 31 | 440 | 70 |
| 32 | 420 | 63 |

The results obtained above show variations in values that are a consequence of normal variations in test parameters, such as temperature, specimen geometry and loading rate. It is observed that a transition occurs at approximately 460° C., which takes place only in the inner glass article since the outermost layer is in a relatively and adequately plastic state.

Most of the test rods did not fail in brittle rupture, but were assumed to have failed when they exhibited irreversible plastic yielding. By comparison, untreated control specimen rods were tested at similar temperatures and developed moduli of rupture comprised between 7 and 14 kg./mm.² (10,000 to 20,000 p.s.i.), with brittle rupture under the test loads.

Example II

Test sample rods of the same size as the rods of Example I, prepared in the same manner but made of borosilicate glass of the following composition (Corning Glass Works Code No. 7720):

| | Percent |
|---|---|
| $Na_2O$ | 4.5 |
| $SiO_2$ | 73.0 |
| $B_2O_3$ | 16.5 |
| PbO | 6.0 | and having a softening point of 770° C. were prepared in the same manner as the rods of Example I and were immersed in a molten bath of lead-silicate glass 8363, for a period of time of 4 hours.

When tested with the arrangement of FIG. 3, the coated test sample rods achieved the results tabulated in FIG. 4. It can be seen, by examining FIG. 4, that the strength of the test sample rods increased with decreasing test temperatures between 600° C. and 450° C. as shown by curve 24. Below 450° C. the strength decreased with decreasing test tempertures, as shown by the points 26 plotted on the chart. It is notable that most sample rods which fractured after reaching a proportional limit of deflection in function of load exhibited a behavior that follows generally the trend of curve 24, while most of the test sample rods which fractured before reaching a proportional limit of deflection, points 26, fall in a region of the chart corresponding to test temperatures below 450° C.

Untreated control sample rods exhibited M.O.R. comprised between 6 and 12 kg./mm.$^2$ at similar test temperatures, between 600° C. and 450° C.

The etching step in the preparation of the test sample rods of Example I and II has been found not to be absolutely necessary for achieving the results indicated. However, the etching step considerably shortens the period of time during which the test sample rods must be dipped in the molten bath of lead-silicate glass to a few hours instead of the several days required for treating unetched rods.

Example III

Test sample rods made of arsenic-sulfur glass of the following composition:

|   | Percent |
|---|---|
| As | 61 |
| S | 39 | and having a softening point of 200° C., were dipped in a bath of molten arsenic-sulfur glass of the following composition:

|   | Percent |
|---|---|
| As | 15 |
| S | 85 | and having a softening point of about 25° C.

Treated glass test sample rods yielded the following M.O.R. when all tested at the same temperature of 100° C.

| Sample No.: | M.O.R. (kg./mm.$^2$) |
|---|---|
| 1 | 3.5 |
| 2 | 3.37 |
| 3 | 3.5 |
| 4 | 3.4 |

By comparison, untreated arsenic-sulfur glass has a normal modulus of rupture of about 0.64 kg./mm.$^2$ at 100° C. as determined by testing control rods.

Thus it can be seen that treated arsenic-sulfur glass experiences an increase in strength of about six times the strength of untreated glass at 100° C.

Example IV

Test sample rods of soda-lime glass, Corning Glass Works Code No. 0080, having the following composition:

|   | Percent |
|---|---|
| SiO$_2$ | 70.14 |
| Na$_2$O | 11.94 |
| CaO | 3.98 |
| MgO | 3.02 |
| Al$_2$O$_3$ | 1.76 |
| B$_2$O$_3$ | 3.33 |
| K$_2$O | 5.45 |
| PbO | 1.01 | were prepared in the following manner:

Test rods of 8 mm. in diameter were tested at room temperature to establish a strength baseline. Measured strengths ranged from 23.0 to 60.0 kg./mm.$^2$ with an average M.O.R. of 42.5 kg./mm.$^2$.

Test sample rods, four inches in length, cut from stock rods, cleaned and dried were immersed in an agitated bath of 15% HF–15% HCl. The test sample rods were etched until a check indicated 0.4 to 0.5 mm. removal from the diameter. After etching the entire jig holder was immersed in distilled water and air dried. Once dried the test sample rods were immersed in the 8363 coating bath at 600° C. for about 4 hours and then tested.

The following tests results were achieved:

| Sample No. | Temperature (° C.) | M.O.R. (kg./mm.$^2$) |
|---|---|---|
| 1 | 385 | 155 |
| 2 | 390 | 150 |
| 3 | 405 | 285 |
| 4 | 410 | 215 |
| 5 | 415 | 275 |
| 6 | 425 | 260 |
| 7 | 435 | 260 |
| 8 | 445 | 165 |
| 9 | 450 | 240 |
| 10 | 465 | 227 |
| 11 | 470 | 175 |
| 12 | 480 | 165 |

Untreated rods of control samples yielded moduli of rupture at test temperatures between 400 and 480° C. varying from 10 to 20 kg./mm.$^2$. Consequently, the treated glass exhibited at least a ten-fold increase in strength as compared to untreated glass, within the above indicated temperature range.

Example V

High purity rods of arsenic trisulfide (As$_2$S$_3$) glass were cast from distilled commercial trisulfide glass. Test sample rods, four inches in length and 6 mm. in diameter, were cut from the bulk rods, control sample rods being cut from the same material.

After trying several different etching solutions, a 0.25 normal NaOH solution was found to yield the most uniform product. The test sample rods were suspended vertically in the solution and the solution stirred constantly to insure uniformity of dissolution. At room temperature, one and half hours of treatment is sufficient to provide a 15% diameter reduction which, according to Proctor (Phys. and Chem. Glasses 3, 7 (1962)) and as confirmed by experience, is sufficient to provide a substantially defect free surface.

Etched test sample rods were rinsed, dried and immersed in a coating bath of 20% arsenic, 30% sulfur and 50% iodine for 4 hours at 100° C.

Strength tests were carried out with the testing techniques described hereinbefore.

The following test results were achieved:

| Sample No. | Temperature (° C.) | M.O.R. (kg./mm.$^2$) |
|---|---|---|
| 1 | 25 | 12.7 |
| 2 | 25 | 14.0 |
| 3 | 25 | 9.1 |
| 4 | 25 | 16.0 |
| 5 | 25 | 12.0 |
| 6 | 50 | 11.7 |
| 7 | 55 | 14.6 |
| 8 | 80 | 9.7 |
| 9 | 85 | 9.0 |
| 10 | 95 | 10.5 |
| 11 | 105 | 8.2 |
| 12 | 110 | 8.2 |
| 13 | 110 | 5.0 |
| 14 | 120 | 8.2 |

Untreated control sample rods were found to have a M.O.R. comprised between 1 and 4 kg./mm.$^2$ at room temperature (25° C.), such modulus of rupture tending to decrease to even lower values with increased test temperature.

The test results tabulated in the above table indicate that, at room temperature, the treated glass rods exhibit a considerable increase in strength as compared to the untreated glass, such improvement in the strength extending into higher temperatures.

Example VI

Test sample rods of soda lime glass. Corning Glass Works Code No. 0080, of composition identical to the composition of Example IV, were etched as explained with respect to Example IV and dipped for 25 minutes in an arsenic-sulfur-iodine molten bath at 120° C., the composition of the As-S-I glass being:

| | Percent |
|---|---|
| As | 20 |
| S | 30 |
| I | 50 |

When tested at 25° C., test sample rods achieved the following M.O.R.

| Sample No.: | M.O.R. (kg./mm.$^2$) |
|---|---|
| 1 | 177.6 |
| 2 | 235.7 |
| 3 | 198.6 |
| 4 | 189.5 |
| 5 | 180.4 |
| 6 | 179.0 |

Thus, it is evident that, at room temperature, treated soda lime glass exhibits in improvement in M.O.R. of about 10 to 20 times as compared to untreated glass.

Example VII

Test sample rods of soda-lime glass, Corning Glass Works Code No. 0080, 7 mm. in diameter, were etched as hereinabove indicated and dipped for 1.5 minutes in a molten bath at 160° C. of the following glass composition:

| | Percent |
|---|---|
| As | 20 |
| S | 15 |
| Se | 15 |
| I | 50 |

The test sample rods were then tested as previously explained, and the following results were achieved at 25° C.

| Sample No.: | M.O.R. (kg./mm.$^2$) |
|---|---|
| 1 | 150 |
| 2 | 68 |
| 3 | 28 |
| 4 | 171 |
| 5 | 163 |
| 6 | 62 |
| 7 | 186 |

If Sample No. 3 is disregarded, the increase in strength of the treated test sample rods is thus a 6 to 15 fold increase. The poor results achieved by Sample No. 3, as compared to the results achieved by the other test sample rods, seems to indicate that Sample No. 3 may have been otherwise defective in presenting a deep flaw that the coating with As-S-Se-I glass only partially remedied.

Because etching of the test sample rods results in removing superficial defects which cause a substantial increase in strength, comparative tests were conducted on etched only test sample rods. The results achieved are tabulated in the chart of FIG. 5, wherein curve 28 represents the evolution of the ratio of the average M.O.R. of coated rods to the M.O.R. of etched only rods in function of aging time. The curve 28 shows that such a ratio increases considerably with the passage of time, etched only rods showing a substantial deterioration of strength with aging until their M.O.R. falls back close to the M.O.R. of bulk glass, while the M.O.R. of treated glass, i.e. etched and coated, remains substantially constant and exhibits practically no deterioration with the passage of time.

Example VIII

Borosilicate glass test sample rods, Corning Works Code No. 7740, of composition identical to Example I, were prepared in the same manner as explained with respect to Example I, but were dipped for 1.5 minutes in a molten bath of As-S-Se-I at 160° C., the composition of the bath being the same as in Example VII.

The following test results were obtained at room temperature (25° C.).

| Sample No.: | M.O.R. (kg./mm.$^2$) |
|---|---|
| 1 | 134 |
| 2 | 132 |
| 3 | 138 |
| 4 | 85 |
| 5 | 125 |
| 6 | 171 |
| 7 | 146 |

Test sample rods immersed in the As-S-Se-I bath at 160° C. for 120 minutes exhibited the following M.O.R. when tested at 25° C.

| Sample No.: | M.O.R. (kg./mm.$^2$) |
|---|---|
| 8 | 161 |
| 9 | 167 |
| 10 | 186 | thus indicating seemingly that prolonged treatment results in increased strength.

As shown by Example III, and more particularly by Examples V, VI, VII and VIII, glasses of greatly improved strength at room temperatures, may be obtained according to the principles of the present invention. Arsenic-sulfur-iodine coating glasses may have a softening point as low as −17° C. and as high as 200° C., as disclosed in United States Letters Patent No. 3,024,119, issued Mar. 6, 1962, the softening point varying within the range indicated according to the relative proportions of the three constituents. Thus high strength glasses may be made for any appropriate ranges of use temperature, extending even into the high temperature ranges of Examples I, II, and IV at which glass is generally not considered a practical structural material in view of its substantial decrease in strength in function of temperature. Some examples of high temperature application of glass materials include pyrometers and other instruments used in proximity to a high temperature source, rocket engines, supersonic aircraft windows and windshields, nuclear reactors, etc.

Having thus described the invention by disclosing a few illustrative examples of practical embodiments thereof, what is considered as being novel and sought to be protected by United States Letters Patent is:

1. An article of high strength glass for use within a temperature range, the article comprising a relatively thick core of a first glass substantially free of surface cracks and flaws, and a relatively thin superficial layer of a second glass, the superficial layer being in a plastic state and the core being in a solid state within said temperature range.

2. The glass article of claim 1 wherein said second glass is selected from a group comprising arsenic-sulfur-iodine and arsenic-sulfur-selenium-iodine glasses.

3. A method of increasing the strength of an article made of a predetermined glass composition for use within a predetermined temperature range, said method comprising substantially removing from the surface of the article cracks and flaws, applying to the surface of the article a coating of a second glass of a composition having affinity with the glass of the article, and maintaining the second glass in a plastic state and the glass of the article in a solid state within said temperature range, whereby the presence of the coating of said second glass inhibits the formation of new cracks and flaws on the surface of the glass of the article.

4. The method of claim 3 wherein the removal of cracks and flaws from the surface of said article before coating with the second glass is effected by etching of the surface of said article.

(References on following page)

References Cited

UNITED STATES PATENTS

| | | | |
|---|---|---|---|
| 2,205,683 | 12/1942 | Engels | 65—60 |
| 3,105,287 | 10/1963 | Whearley et al. | 65—60 |
| 3,253,896 | 5/1966 | Woodcock et al. | 65—4 X |

OTHER REFERENCES

Nordberg et al.: "Strengthening by Ion Exchange," J. of Amer. Ger. Soc., vol. 47, No. 5, pp. 215–219, May 1964.

Morley: "Strength of Glass Fibers," Nature, vol. 184, p. 1560, November 1959.

DONALL H. SYLVESTER, *Primary Examiner.*

ROBERT L. LINDSAY, *Assistant Examiner.*

U.S. Cl. X.R.

65—60, 121; 117—124, 125